Feb. 26, 1963　　　ICHIRO SATO ETAL　　　3,079,537
CAPACITOR
Filed Dec. 4, 1959
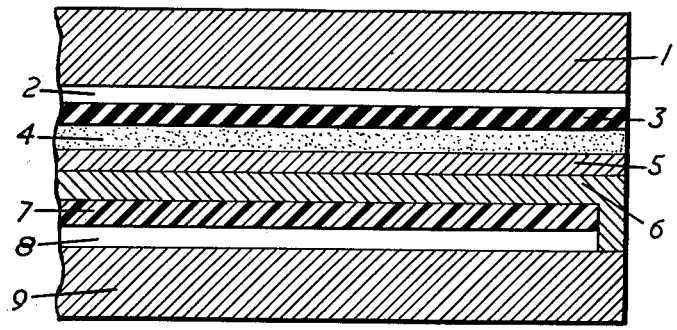
Inventor
I. SATO-E. OKAMOTO-
Y. SEKI
By
Robert Harding Jr
Attorney 3,079,537
CAPACITOR
Ichiro Sato, Eiichi Okamoto, and Yasuo Seki, all of Tokyo, Japan, assignors to Nippon Electric Company Limited, Tokyo, Japan, a corporation of Japan
Filed Dec. 4, 1959, Ser. No. 857,345
Claims priority, application Japan Dec. 9, 1958
6 Claims. (Cl. 317—258)

This invention relates to capacitors of the rolled type in which very thin films of metal and dielectric are used.

A capacitor in which an anodic oxide film is formed as a dielectric on a metal surface of tantalum, aluminum, zirconium or titanium etc., and with a semiconductor layer like germanium, or an insulator layer like magnesium fluoride, or their conjugate layer, coated on the anodic oxide film by a method of evaporation or cathode sputtering, and further with a conductive layer like aluminum formed thereon by the same method, whereby the above-mentioned basic metal and coated conductive layer constitute the two electrodes of the said capacitor, has the advantages of being usable at specially high or low temperatures since it does not have an electrolyte as does the usual electrolytic capacitor, of also having good temperature characteristics of capacitance and power factor, and of being stable without deterioration. The principles involved are explained in U.S. Patent No. 2,836,776, granted May 27, 1958.

Formerly where the coated conductive layer of aluminum applied by evaporation is regarded as an electrode, a practical method of providing a lead-out terminal is to bring into contact with said layer an organic insulating film, for example, a polyethylene terephthalate resin film on which aluminum has been evaporated. The aluminum evaporated layer formed on the resin film is regarded as an outlet leading wire for the electrode. Further, a metal leaf, such as silver, is brought in contact with one end of the evaporated layer, and has a metal wire connected to it which acts as the electrode terminal.

However, the above type terminal is not completely effective since an unstable contact between the metal leaf and the aluminum evaporated layer is formed, i.e., with an applied voltage portions of the evaporated layer and edges of the metal leaf selectively short circuit, causing these portions to disappear, and insulating pockets to be formed.

An object of the present invention is to provide a dry type capacitor using very thin metal films and having favorable temperature characteristics in which the connections to the electrodes may be easily made.

Another object of the invention is to provide a capacitor of the dry type having electrodes of very thin metal films in which the danger of short circuits in use is reduced and the effects are less harmful.

Another object of the invention is to provide a capacitor of the dry type having at least one very thin metal film electrode with means for materially decreasing the resistance of said electrode.

The invention is illustrated in the single figure which represents a greatly enlarged cross section of a capacitor embodying the invention. The capacitor shown in the figure is constructed of two different parts. One of them is composed of five parts as follows: the base metal 1 of tantalum (aluminum, zirconium, titanium, or the like), an anodic oxide film 2 as a dielectric formed on the base metal 1, a layer of insulating material 3, such as magnesium fluoride, on the anodic oxide film 2, a semiconductor layer 4, such as germanium, which is deposited on the layer 3 of insulating material by vacuum evaporation, cathode sputtering, or the like, and a layer of conductive material 5, such as aluminum, which is deposited on the layer 4 by the same method as the semi-conductor 4. The above-mentioned base metal 1 acts as one electrode of the capacitor.

This first part of the capacitor is actually the effective part, the base metal 1 and the conductive layer 5 forming the two electrodes. However, since the layer 5 is extremely thin, it is not only difficult to make connection to it, but it has a considerable resistance so that other means must be provided to obtain a uniform potential difference between corresponding points on the two electrodes. Moreover it is difficult to protect the film against damage in rolling the capacitor. These difficulties are solved by the addition of the second part of the capacitor.

This second part of the capacitor is composed of four parts, as follows: the base metal 9 which is different from the above-mentioned base metal 1, an anodic oxide layer 8, formed on the base metal 9, a layer of an organic insulating material 7 on the anodic oxide layer 8, and a layer of conductive material 6 on the layer of an organic insulating material 7.

One end of the layer of the conductive material 6 is then brought into contact with the base metal 9. The capacitor is completed by bringing the layers of conductive materials 5 and 6 of the two different parts into contact with each other.

The layer of organic insulating material 7 is used to improve the mechanical properties of the oxide layer 8. If the anodic oxide layer 8 is not present or is imperfect for insulating purposes, instantaneous spark caused by a short circuit at the imperfect parts of the anodic oxide film 2 will be apt to make the base metal 9 irregularly deform by thermal and mechanical shocks and contact with the so deformed base metal 1, and so self-healing action, which is found in the case of metallized paper capacitors cannot be obtained.

But if the layer of organic insulating material 7 is applied on the anodic oxide layer 8, the layers 7 and 8 together will withstand the shock of the above-mentioned spark caused by a short circuit between the base metal 1 and the layer of conductive material 5, and only a limited area of the thin layers of conductive materials 5 and 6 around the spark point is destroyed and so the short circuit is self-healed.

The layer of organic insulating material 7, by itself, has poor tensile strength and elasticity in a membranous state and is delicate in rolling operations. But when it is coated and combined on a metal surface having anodic oxide film, it can be satisfactorily used. Organic insulating material, such as silicon resin, that is too hard to make a thin and strong film by itself, but has superior thermostability, can also be used, and the deformation of the layer of organic insulating material by expansion and contraction due to heat is reduced, because it is coated and combined with the porous surface of the anodic oxide film according to the invention.

The metal layer 9 acts as the actual lead-in for the electrode 5, since the coating 6, is a very thin vacuum evaporated metal film. Hence the coating 6 must be short circuited to the metal 9, and in such a construction, a good effect is obtained. The high electrical resistance between the ends of the layer of conductive material 5 can be remarkably lowered by the short circuit of the layer 6 to the metal 9 through the entire surface.

The anodic oxide film 8 is formed, for instance, of the so-called "Alumite" which is in an extremely porous state. The layer 7 is produced thereon in a pinhole state according to a known method. Hence, when the conductive layer 6 is applied by a method, as, for instance, vacuum evaporation, evaporating metal grains get into the holes, and thus the conductive layer 6 and basic metal 9, not only come into contact electrically with each other at the one end, but also come into contact all over the surface through the holes, and the electrical resistance between the ends of the evaporating conductive layer 6 is remarkably decreased. For instance, the resistance is decreased from ⅕ to ⅟₁₀ of the resistance of one formed with an aluminum evaporating conductive layer on ethylene tetrafluoride resin film of 0.05 mm. thickness. Thus, in constructing a capacitor, we can obtain one which has low loss, and stable and superior characteristics owing to the decrease of the resistance of conductive layer, and the superior feature that it can be used even at 200° C. or more.

An example of the invention will now be given. Anodic oxidation is formed on a tantalum leaf of 0.013 mm. thickness at 110 v. in amonium carbonate aqueous solution, after which layers of magnesium fluoride, germanium, and aluminum are formed on the surface by vacuum evaporation. The tantalum leaf is regarded as an anode. Anodic oxidation of an aluminum leaf of 0.02 mm. thickness is produced by direct current in sulphuric acid, which forms a so-called "Alumite" film, after which a layer of silicon polymer of 0.04 mm. to 0.06 mm. thickness is applied to the surface. It is then heated and dried and an aluminum layer is formed on it by evaporation. By forming an aluminum layer onto the end portion at which point the silicon polymer is not applied, an electrical connection is made between it and the aluminum leaf. The metal leaves thus finished are rolled together and an anode terminal is made by welding Kovar alloy wire to one end of the tantalum leaf which wire is led out for the anode terminal. A cathode terminal is provided by welding Kovar alloy wire to one end of the aluminum leaf. The capacitor is then sealed in a cylindrical metal case by using glass terminals.

The capacitor formed above had a capacity of $1.5/\mu$ F., and withstood 35 v. at normal temperature. While applying a voltage of 20 v. about 100 hours at 200° C. and about 5 hours at 250° C., no increase of leakage current, short circuit, or other abnormal occurrences could be observed. Up to the present, the highest temperature to which a solid electrolytic capacitor having an anodic oxide film as a dielectric could be raised was 150° C.

In the above-mentioned example an anodic oxide film was first formed on the surface of the aluminum leaf. When, however, a thickened coating of silicon polymer film was applied directly to the aluminum leaf approximately the same result was achieved but the thermostability seemed to be somewhat inferior.

Fluorine polymers, alkyds polymers, and furan polymers etc., are also usable as an organic insulating material however, it has been found that silicon polymers are the most suitable in order to produce a capacitor with the best thermostability and one which is stable at high temperature.

Although manifold layers of an insulator and a semiconductor on an anodic oxide film for the dielectric are preferred, an insulator layer alone, like magnesium fluoride and calcium fluoride, or a semiconductor layer alone, like germanium and lead sulphate, are sufficient. But capacitors so made have the disadvantages of being somewhat unstable, being easy to short circuit, and in mass production tending to produce a large fraction of defectives.

While we have described above the principles of our invention in connection with specific apparatus, it is to be clearly understood that this description is made only by way of example and not as a limitation to the scope of our invention as set forth in the objects thereof and in the accompanying claims.

What we claim is:

1. A capacitor of the dry type comprising first and second juxtaposed parts, said first part comprising a metal base, an anodic layer on said base, an insulating layer on said anodic layer, a semi-conductor layer on said insulating layer, and a metal layer on said semi-conductor layer, and said second part comprising a metal leaf, a porous anodic layer on said metal leaf, a layer of insulating material having a plurality of pinholes on said anodic layer, and a film of metal deposited on said insulating layer by evaporation, whereby grains of the metal will penetrate the holes in said porous anodic layer and said layer of insulating material having the pinholes, said parts being juxtaposed with said last mentioned metal film of said second part in contact with said metal layer of said first part.

2. A capacitor comprising a pair of electrodes at least one of which is a thin film of metal, insulating means separating said electrodes, a metal leaf spaced from said thin film of metal, and separating means maintaining said film and leaf in spaced relation and comprising an organic insulating layer having a plurality of pinholes therethrough and means for electrically connecting corresponding points on said film and said leaf through said pinholes.

3. A capacitor as defined in claim 2 in which the other of the pair of electrodes is a metal leaf with an anodic oxide film formed thereon.

4. A capacitor as defined in claim 2 further comprising a porous anodic layer on the metal leaf, the last mentioned means comprising grains of metal extending through the pinholes and the pores of said porous anodic layer.

5. A capacitor, as defined in claim 4, in which the grains of metal are part of an auxiliary metal film deposited on the organic insulating layer by evaporation.

6. A dry electrolytic capacitor comprising first and second coextensive parts, said first part comprising a metal base selected from the group consisting of tantalum, zirconium, aluminum and titanium, an anodic oxide film on said base, an insulating layer on said film, a semiconductor layer on said insulating layer and an aluminum film deposited on said semiconductor layer, said second part comprising a metal leaf selected from a different metal of the above group, a porous anodic oxide film on said leaf, a layer of insulating material having a plurality of pinholes therethrough on said anodic film and being selected from the group consisting of silicon polymers, fluorine polymers, alkyds polymers and furan polymers, and a film of aluminum deposited on said insulating layer whereby grains of the aluminum penetrate the pinholes in the insulating layer and the holes in the porous anodic film, said parts being juxtaposed with said aluminum film of said second part in contact with the aluminum film of said first part.

References Cited in the file of this patent

UNITED STATES PATENTS

| 1,906,691 | Lilienfeld | May 2, 1933 |
| 2,836,776 | Yoshioki | May 27, 1958 |

FOREIGN PATENTS

| 160,620 | Australia | Feb. 4, 1954 |
| 705,353 | Great Britain | Mar. 10, 1954 |